June 23, 1964  W. E. TRAGERT  3,138,488
FUEL CELL
Filed March 8, 1961
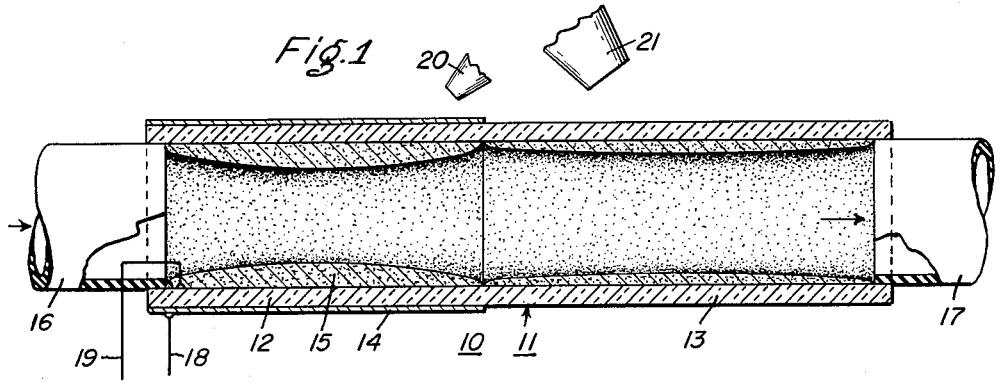
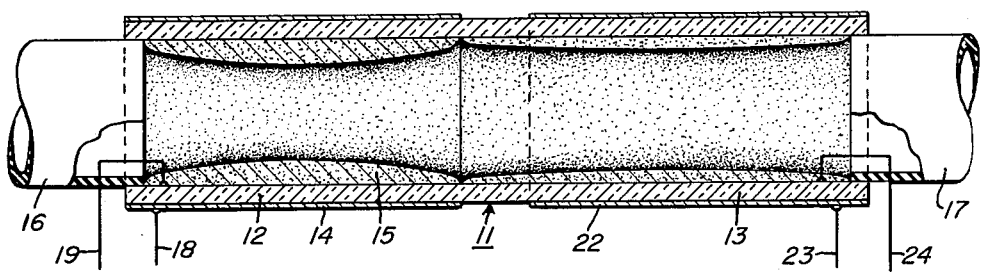
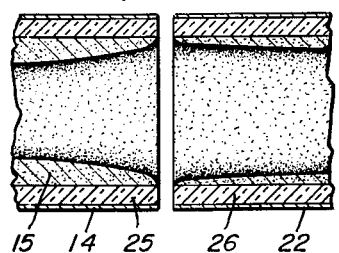
Inventor:
William E. Tragert,
by Paul R. Webb, II
His Attorney.

3,138,488
FUEL CELL
William E. Tragert, Scotia, N.Y., assignor to General
Electric Company, a corporation of New York
Filed Mar. 8, 1961, Ser. No. 94,241
4 Claims. (Cl. 136—84)

This invention relates to fuel cells and more particularly to high temperature fuel cells in which the cathode is in liquid state and the electrolyte and anode are in solid state during cell operation.

High temperature fuel cells would be advantageous to provide a low voltage direct current power source on a continuous basis. Such cells should employ preferably a carbonaceous fuel, exhibit stability and efficiency and be low in cost. These cells would have application in various chemical process industries, such as the manufacture of aluminum and the electro-refining of copper. Furthermore, the operation of direct current motors could be accomplished with these cells. Waste heat can be employed effectively to operate the cells.

In my copending application, Serial No. 92,354, filed February 28, 1961, a high temperature fuel cell is disclosed and claimed which comprises a silver cathode characterized by being in liquid state during cell operation at high temperatures, means for supplying a gaseous oxidant to the cathode, a solid stabilized zirconia electrolyte, one surface of the electrolyte in direct contact with the cathode, means for providing a carbonaceous fuel, and the other surface of the electrolyte in direct contact with the fuel means, the electrolyte and fuel means characterized by being in solid state during cell operation at high temperatures. The present invention provides an improved high temperature fuel cell wherein the effluent from the carbonaceous fuel is cooled and deposited on another portion of the electrolyte for subsequent usage.

It is an object of my invention to provide a high temperature fuel cell which employs a carbonaceous fuel, exhibits stability and efficiency and is low in cost.

It is another object of my invention to provide a fuel cell operable at high temperatures in the range of 1000° C. to 1200° C.

It is another object of my invention to provide a high temperature fuel cell which employs a cathode in liquid state, and an electrolyte and an anode in solid state during cell operation at high temperatures.

It is a further object of my invention to provide a high temperature fuel cell which cools and deposits the effluent from the carbonaecous fuel on another portion of the electrode for subsequent usage.

In carrying out my invention in one form, a high temperature fuel cell comprises a hollow member consisting of solid stabilized zirconia, a silver electrode in direct contact with a portion of a surface of the member, the silver electrode characterized by being in liquid state during cell operation at high temperatures, means for supplying a gaseous oxidant to the silver electrode, means for providing a carbonaceous fuel to a portion of a surface of the member opposite the electrode, and means for controlling the temperature of the uncoated portion of the member.

These and various other objects, features, and advantages of the invention will be better understood from the following description taken in connection with the accompanying drawing in which:

FIGURE 1 is a sectional view of a high temperature fuel cell embodying my invention;

FIGURE 2 is a sectional view of a modified high temperature fuel cell; and

FIGURE 3 is a sectional view of a portion of another modified high temperature fuel cell.

In FIGURE 1, a high temperature fuel cell is shown generally at 10 which comprises a solid stabilized zirconia electrolyte in the form of a hollow member 11, which includes a first portion 12 and a second portion 13, and a silver electrode 14 in direct contact with first portion 12 of the exterior surface of member 11. A carbonaceous fuel 15 is provided to first portion 12 of the interior surface of member 11 opposite electrode 14. For example, an inlet line 16 supplies a hydrocarbon gas, such as methane or propane to cell 10 wherein the gas is thermally decomposed to a carbonaceous fuel which is supplied to the interior surface of portion 12 of member 11 as an anode. An outlet line 17 removes the carbon dioxide from the cell. The electrode can be reversed with the silver electrode in direct contact with the interior surface of portion 12 of member 11 while the carbonaceous anode is in direct contact with the exterior surface thereof. A silver lead 18 is attached to silver electrode 14 while a carbon lead 19 contacts anode 15 by being positioned adjacent electrolyte portion 12. The free ends of the leads are connected to apparatus (not shown) being operated by the cell. Means are provided for supplying a gaseous oxidant in the form of air or oxygen to silver electrode 14. For example, a tube 20 connected to an oxidant supply (not shown) supplies oxidant to electrode 14. Means are also provided in the form of an air outlet 21 to control the temperature of second portion 13 of member 11.

In FIGURE 2, a modified high temperature fuel cell is shown which comprises a solid stabilized zirconia electrolyte in the form of a hollow member 11, which includes a first portion 12 and a second portion 13, and silver electrodes 14 and 22 in direct contact with portions 12 and 13 of exterior surface of member 11 and spaced apart. A carbonaceous fuel 15 is provided to first portion 12 of member 11 opposite electrode 14. For example, an inlet line 16 supplies a hydrocarbon gas, such as methane or propane to the cell wherein the gas is thermally decomposed to a carbonaceous fuel which is supplied to the interior surface of portion 12 of member 11 as an anode. An outlet line 17 removes the carbon dioxide from the cell. The electrodes can be reversed with the silver electrode in direct contact with portion 12 of the interior surface of member 11 while the carbonaceous anode is in direct contact with portion 12 of the exterior surface thereof. A silver lead 18 is attached to silver electrode 14 while a carbon lead 19 contacts anode 15 by being positioned adjacent electrolyte portion 12. The free ends of the leads are connected to apparatus (not shown) being operated by the cell. A silver lead 23 is attached to silver electrode 22 while a carbon lead 24 contacts the opposite surface of portion 13 of member 11. Means are provided for supplying a gaseous oxidant in the form of air or oxygen to each of silver electrodes 14. For example, tubes 20 connected to an oxidant supply (not shown) supplies oxidant to electrodes 14 and 22. Means are also provided in the form of air outlets 21 to control the temperature of portions 12 and 13 of member 11.

In FIGURE 3, another modified high temperature fuel cell is partially shown which comprises a solid stabilized zirconia electrolyte in the form of a pair of hollow members 25 and 26, silver electrodes 14 and 22 in direct contact with the exterior surfaces of members 25 and 26. A carbonaceous fuel 15 is provided to the interior surface of member 25. An inlet line provides a hydrocarbon gas, such as methane or propane to the cell wherein the gas is thermally decomposed to a carbonaceous fuel which is supplied to the interior surface of member 25 as an anode. An outlet line removes the carbon dioxide from the cell. The electrodes can be reversed with the silver electrode in direct contact with the interior surface of member 25 while the carbonaceous anode is in direct contact with the exterior surface thereof. A silver lead is attached to silver electrode 14 while a carbon lead contacts anode 15 by being positioned adjacent electrolyte 23. The free ends of the leads are connected to apparatus (not shown) being operated by the cell. A silver lead is attached to silver electrode 22 while a carbon lead contacts the opposite surface of member 26. Means are provided for supplying a gaseous oxidant in the form of air or oxygen to each of silver electrodes 14 and 22. For example, tubes 20 connected to an oxidant supply (not shown) supplies oxidant to electrodes 14 and 22. Means are also provided in the form of air outlets 21 to control the temperature of members 25 and 26.

I discovered that an efficient, stable fuel element could be constructed and operated in the temperature range of 1000° C. to 1200° C. to provide a low voltage direct current power source. I found that a preferred cathode was silver to which an oxidant was supplied during cell operation. My development disclosed further that a carbonaceous fuel provided a suitable anode for the cell. The carbonaceous fuel was provided in the form of a decomposed hydrocarbon gas. The cathode is characterized by being in liquid state and the electrolyte and anode are characterized by being in solid state during cell operation at high temperatures. I found that a carbon lead could contact the anode while a stainless steel lead encased substantially in insulation could be inserted in the silver electrode. A tube directed toward this electrode provides oxygen or air to the silver in molten state during cell operation.

Solid, "stabilized" zirconia is an oxygen ion transport medium which can be used as the electrolyte in such a high temperature fuel cell. "Stabilized" zirconia is a compound with a cubic crystal structure consisting of zirconia to which is added calcium oxide, yttrium oxide, or mixed rare earth oxides. Substantially pure zirconia, that is a compound with a monoclinic structure which is not "stabilized" by the addition of the above oxides, experiences volume changes when cycled thermally with resultant shattering of the material. Furthermore, substantially pure zirconia is an electronic conductor, this property being inimical to fuel cell operation. "Stabilized" zirconia is resistant to large volume changes upon thermally cycling and hence is mechanically stable. Additionally, "stabilized" zirconia serves as an oxygen ion transport medium by virtue of the anion vacancies generated in the zirconia structure upon cationic substitution of calcium for zirconium. Each substitution of a divalent calcium ion for a tetravalent zirconium ion results in a charge unbalance in the crystal that is redressed by the absence of a divalent oxygen ion from a normally occupied anion site in the lattice. The concentration of vacancies is thus equal to the concentration of calcium ions in the zirconia. Since the movement of an oxygen ion vacancy through the lattice is the converse of an oxygen ion movement in the opposite direction, a relatively high degree of oxygen mobility can be realized at fuel cell operating temperatures where the ion-vacancy interchange occurs readily. A flux of oxygen through the stabilized zirconia lattice is effected by the establishment of an electric field resulting from the chemical potential difference for oxygen existing across the crystal. The resultant relatively good conductivity, coupled with chemical stability and strength of the stabilized zirconia provides a very satisfactory electrolyte for high temperature fuel cells.

In the operation of fuel cell 10 in FIGURE 1, heat, such as waste heat, is supplied from a source (not shown) to raise the temperature of electrode 14 in the range of 1000° C. to 1200° C. Molten silver cathode 14 is then saturated with oxygen supplied from tube 20. A carbonaceous fuel 15 is provided to the interior surface of portion 12 of member 11. For example, an inlet line 16 supplies a hydrocarbon gas, such as methane or propane to cell 10 wherein the gas is thermally decomposed to a carbonaceous fuel. Carbon vapor, which has been produced from a carbonaceous source (not shown) can be supplied through inlet line 16 and deposited on the interior surface of portion 12. The reaction at the cathode-electrolyte interface is as follows:

(1)   $O + 2e \rightarrow O^=$

The oxygen ion moves through electrolyte portion 12 to combine with carbon in accordance with the following reaction at the anode-electrolyte interface:

(2)   $C + O^= \rightarrow CO + 2e$

The electrons, which are given up at the anode are conducted through lead 19 to the apparatus (not shown) being operated while the oxygen at the cathode combines with the returning electrons. The carbon monoxide generated at the anode, which would be released to the atmosphere, provide further heat for cell 10, or be fed to a fuel cell employing carbon monoxide as a fuel is passed through cell 10 to portion 13 of member 11. An air outlet 21 provides an air supply against portion 13 to cool this portion to a temperature of about 400° C. The Bourdouard reaction will proceed with the disproportionation going over 90 percent to completion as follows:

(3)   $CO \rightarrow CO_2 + C$

The disproportionated carbon deposits on the interior surface of portion 13 for subsequent usage as a carbonaceous fuel. Outlet line 17 removes the carbon dioxide from cell 10.

In the operation of the fuel cell in FIGURE 2, heat, such as waste heat, is supplied from a source (not shown) to raise the temperature of electrode 14 of the cell in the range of 1000° C. to 1200° C. Molten silver cathode 14 is then saturated with oxygen supplied from tube 20. A carbonaceous fuel 15 is provided to the interior surface of portion 12 of member 11. For example, inlet line 16 supplies a hydrocarbon gas, such as methane or propane to cell 10 wherein the gas is thermally decomposed to a carbonaceous fuel. Carbon vapor, which has been produced from a carbonaceous source (not shown) can be supplied through inlet line 16 and deposited on the interior surface of portion 12. The reaction at the cathode-electrolyte interface is as follows:

(1)   $O + 2e \rightarrow O^=$

The oxygen ion moves through electrolyte portion 12 to combine with carbon in accordance with the following reaction at the anode-electrolyte interface:

(2)   $C + O^= \rightarrow CO + 2e$

The electrons, which are given up at the anode are conducted through lead 19 to the apparatus (not shown) being operated while the oxygen at the cathode combines with the returning electrons. The carbon monoxide which is generated at the anode, which would be released to the atmosphere, provide further heat for cell 10, or be fed to a fuel cell employing carbon monoxide as a fuel is passed through cell 10 to portion 13 of member 11. An air outlet 21 provides an air supply against portion 13 to cool this portion to a temperature of about 400° C. The Bourdouard reaction will proceed with the disproportionation going over 90 percent to completion as follows:

(3)   $CO \rightarrow CO_2 + C$

The disproportionated carbon deposits on the interior surface of portion 13 for subsequent usage as a carbonaceous fuel. Outlet line 17 removes the carbon dioxide from the cell.

After carbon has been deposited on the interior surface of portion 13, the waste heat is discontinued to electrode 14 and supplied to electrode 22 to raise the temperature of electrode 22 in a range of 1000° C. to 1200° C. Air outlet 21 directed against portion 13 is discontinued and air outlet 21 is directed toward portion 12 to cool this portion to about 400° C. Molten silver cathode 22 is then saturated with oxygen supplied from tube 20 while the oxygen supplied to cathode 14 from tube 20 is discontinued. Inlet line 16 and outlet line 17 are reversed. Carbon, which has been deposited on portion 13 is the carbonaceous fuel for the cell. If desired, it is supplemented by additional carbonaceous fuel through the reversed inlet line. Reactions 1 and 2 above occur during the cell operation. Carbon monoxide gas generated at the anode of deposited carbon is released to the atmosphere or employed as above described. The electrons, which are given up at the anode are conducted through lead 24 to the apparatus (not shown) being operated while the oxygen at the cathode combines with the returning electrons from lead 23.

The operation of the cell shown in FIGURE 3 is identical with the operation of the cell shown in FIGURE 2 with the following exceptions. In FIGURE 3, two adjacent, spaced members are employed rather than spaced electrodes to separate the electrical conductivity of the members.

Examples of fuel cells which are in accordance with the present invention are as follows: Each cell consists of a hollow member of solid stabilized zirconia with a pair of spaced silver electrodes in direct contact with exterior surface of the member. Each cell is heated to a temperature in the range of 1000° C. to 1200° C. An electrical lead is attached to the first silver electrode and another electrical lead is attached to the interior surface of the electrolyte opposite the first electrode. Oxygen is supplied to the first electrode while cooling air is provided to the portion of the member contracted by the second electrode. The carbonaceous fuel is provided from the thermal decomposition of propane or natural gas. In Table I, there is set forth for each cell its carbonaceous fuel, operating temperature, load voltage in volts and current density in milliamperes.

*Table I*

| Cell No. | Fuel | Temp., °C. | Load Voltage (V) | Current Density (ma./cm.$^2$) |
|---|---|---|---|---|
| 1 | Propane | 1,060 | .70 | 21.0 |
| 2 | do | 1,080 | .70 | 3.0 |
| 3 | Natural gas | 1,140 | .61 | 52.8 |
| 4 | do | 1,150 | .63 | 10.0 |
| 5 | do | 1,130 | .70 | 13.0 |
| 6 | do | 1,117 | .70 | 70.0 |
| 7 | do | 1,050 | .80 | 4.0 |
| 8 | do | 1,045 | .70 | 6.0 |
| 9 | do | 1,035 | .76 | 15.0 |
| 10 | do | 1,130 | .70 | 2.0 |
| 11 | do | 1,150 | .60 | 80.0 |

While other modifications of this invention and variations thereof which may be employed within the scope of the invention have not been described, the invention is intended to include such that may be embraced within the following claims.

What I claim as new and desire to secure by Letters Patent of the United States is:

1. A fuel cell comprising a hollow member consisting of solid stabilized zirconia, said member comprising two adjacent portions, a silver electrode in direct contact with a surface of the first portion of said member, said silver electrode characterized by being in liquid state during cell operation at temperatures in the range of 1000° C. to 1200° C., means for supplying a gaseous oxidant containing molecular oxygen to said silver electrode, means for providing a carbonaceous fuel to the opposite surface of the first portion of said member, and means for cooling the second portion of said member whereby the gas from said first portion is disproportioned to carbon.

2. A fuel cell comprising a hollow member consisting of solid stabilized zirconia, said member comprising two adjacent portions, a silver electrode in direct contact with the exterior surface of the first portion of said member, said silver electrode characterized by being in liquid state at temperatures in the range of 100° C. to 1200° C., means for supplying a gaseous oxidant containing molecular oxygen to said silver electrode, means for providing a carbonaceous fuel to the interior surface of the first portion of said member, and means for cooling the second portion of said member whereby the gas from said first portion is disproportioned to carbon.

3. A fuel cell comprising a hollow member consisting of solid stabilized zirconia, said member comprising two adjacent portions, a first silver electrode in direct contact with a surface of said first portion of said member, a second silver electrode in direct contact with the same surface of said second portion of said member, said electrodes spaced apart, said silver electrodes characterized by being in liquid state during cell operation at temperatures in the range of 1000° C. to 1200° C., means for supplying a gaseous oxidant containing molecular oxygen to each of said silver electrodes, means for providing a carbonaceous fuel to the opposite surface of said first portion of said member, and means for cooling the said second portion of said member whereby the gas from said first portion is disproportioned to carbon.

4. A fuel cell comprising a hollow member consisting of solid stabilized zirconia, said member comprising two adjacent portions, a first silver electrode in direct contact with the exterior surface of said first portion of said member, a second silver electrode in direct contact with the exterior surface of said second portion of said member, said electrodes spaced apart, said electrodes characterized by being in liquid state at temperatures in the range of 1000° C. to 1200° C., means for supplying a gaseous oxidant containing molecular oxygen to each of said silver electrodes, and means for providing a carbonaceous fuel to the interior surface of said first portion of said member, and means for cooling the said second portion of said member whereby the gas from said first portion is disproportioned to carbon.

References Cited in the file of this patent

UNITED STATES PATENTS

| | | |
|---|---|---|
| 2,384,463 | Gunn et al. | Sept. 11, 1945 |
| 2,890,259 | Weininger | June 9, 1959 |